United States Patent
Osawa

(10) Patent No.: US 8,678,845 B2
(45) Date of Patent: Mar. 25, 2014

(54) CHARGING CONNECTOR HAVING A HOUSING HAVING A COVER AND A BASE WITH POSITIONING PROJECTIONS

(75) Inventor: Kiyoshi Osawa, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 0 days.

(21) Appl. No.: 13/421,940

(22) Filed: Mar. 16, 2012

(65) Prior Publication Data

US 2012/0238131 A1    Sep. 20, 2012

(30) Foreign Application Priority Data

Mar. 17, 2011    (JP) ................. 2011-059438

(51) Int. Cl.
*H01R 13/627*    (2006.01)
(52) U.S. Cl.
USPC ........................................................ 439/352
(58) Field of Classification Search
USPC .................... 439/731, 345, 352, 460, 353
See application file for complete search history.

(56) References Cited

U.S. PATENT DOCUMENTS

| | | | | |
|---|---|---|---|---|
| 6,071,145 A | * | 6/2000 | Toly | 439/485 |
| 6,089,924 A | * | 7/2000 | Wang | 439/694 |
| 6,123,569 A | | 9/2000 | Fukushima et al. | |
| 6,454,612 B1 | * | 9/2002 | Wang | 439/694 |
| 6,619,987 B2 | * | 9/2003 | Kumamoto et al. | 439/607.46 |
| 6,663,415 B1 | * | 12/2003 | Wu | 439/460 |
| 8,128,440 B2 | * | 3/2012 | Matsumoto et al. | 439/731 |
| 8,206,171 B2 | * | 6/2012 | Osawa et al. | 439/352 |
| 2004/0177989 A1 | | 9/2004 | Nass et al. | |
| 2010/0197171 A1 | | 8/2010 | Matsumoto et al. | |
| 2011/0223792 A1 | * | 9/2011 | Osawa et al. | 439/345 |
| 2012/0238130 A1 | * | 9/2012 | Osawa et al. | 439/460 |

FOREIGN PATENT DOCUMENTS

| | | |
|---|---|---|
| DE | 202008009929 | 1/2010 |
| JP | 2003-036924 | 2/2003 |

* cited by examiner

*Primary Examiner* — Chandrika Prasad
(74) *Attorney, Agent, or Firm* — Gerald E. Hespos; Michael J. Porco; Matthew T. Hespos

(57) ABSTRACT

A charging connector (10) has a housing (11) integrally formed by bolting a pair of half members. A front housing (20) is mounted in a front end portion of the housing (11) and tightly held by two housings (30, 40). A positioning rib (16) for positioning the housings (30, 40) is provided at a position of the base-side housing (30) distant from the front housing (20) and comes into contact with the inner surface of the cover-side housing (40) when the housings (30, 40) are assembled properly.

12 Claims, 15 Drawing Sheets

CHARGING CONNECTOR HAVING A HOUSING HAVING A COVER AND A BASE WITH POSITIONING PROJECTIONS

BACKGROUND OF THE INVENTION

1. Field of the Invention

The invention relates to a charging connector.

2. Description of the Related Art

Japanese Unexamined Patent Publication No. 2003-36924 discloses a charging connector for charging a battery installed in an electric vehicle. The charging connector includes a grip integrally formed by bolting first and second half members together. A fitting pin projects from a surface of the first half member and is fit in a pin fitting hole of the second half member to position the half members.

However, a base is required where the pin fitting hole is formed, and such a base normally is provided by padding on the facing surface of the other half member projecting radially inwardly. Accordingly, the pin fitting hole can be provided if sufficient space exist in a housing, but the base cannot be set and the two half members cannot be positioned if insufficient space exists in the housing.

The invention was completed in view of the above situation and an object thereof is to position two half members without being subject to spatial restriction.

SUMMARY OF THE INVENTION

The invention relates to a connector with a housing formed by fixing first and second half members together. A connector connecting portion is mounted in a front part of the housing and is held tightly by the half members. At least one positioning portion is provided at a position of the first half member distant from the connector connecting portion for positioning the half members. The positioning portion contacts the inner surface of the second half member when both half members are assembled in proper postures.

The half members preferably are fixed to each other by bolting.

The half members can be positioned by bringing the positioning portion into contact with the inner surface of the other half member. Thus, it is sufficient to provide a functional portion necessary to position the half members only in the first half member and such a functional portion need not be provided in the second half member. Therefore, the half members can be positioned without being subject to spatial restriction.

A plurality of bolt fastening portions may be arranged in the second half member; and the positioning portion may be located to prevent the second half member from rotating upon receiving a rotational force as the bolt most distant from the connector connecting portion is tightened. More particularly, the positioning portion contacts the inner surface of the second half member even if the second half member tries to rotate during the bolt tightening operation. Therefore, the second half member will not rotate and both half members are held in proper postures.

The positioning portion may be connected to a first opening edge of the first half member and the bolt fastening portion may be connected to a second opening edge substantially facing the first opening edge. Thus, the positioning portion is at the position as far apart as possible from the bolt fastening portion. Accordingly, the rotational force received when the bolt is tightened can be minimized.

The housing may include a grip behind the connector connecting portion and at least one wire is drawn out from the grip. The positioning portion may be provided in the grip.

The connector connecting portion is held firmly by both half members and both half members can be held firmly in a rigid state. However, unlike the connector connecting portion, the grip has no member that is held firmly. Thus, the two half members could be displaced. However, the positioning portion in the grip prevents displacements of the half members in the grip.

A holding member may be mounted into a mounting portion in the housing for holding the wire fixed with respect to the housing. The mounting portion may be divided substantially bilaterally symmetrically by both half members and the mounting portions of the two half members may be arranged to substantially face each other with the half members assembled. The positioning portion may be adjacent to the mounting portion.

These and other objects, features and advantages of the present invention will become more apparent upon reading of the following detailed description of preferred embodiments and accompanying drawings.

DETAILED DESCRIPTION OF THE PREFERRED EMBODIMENTS

Figure 1:
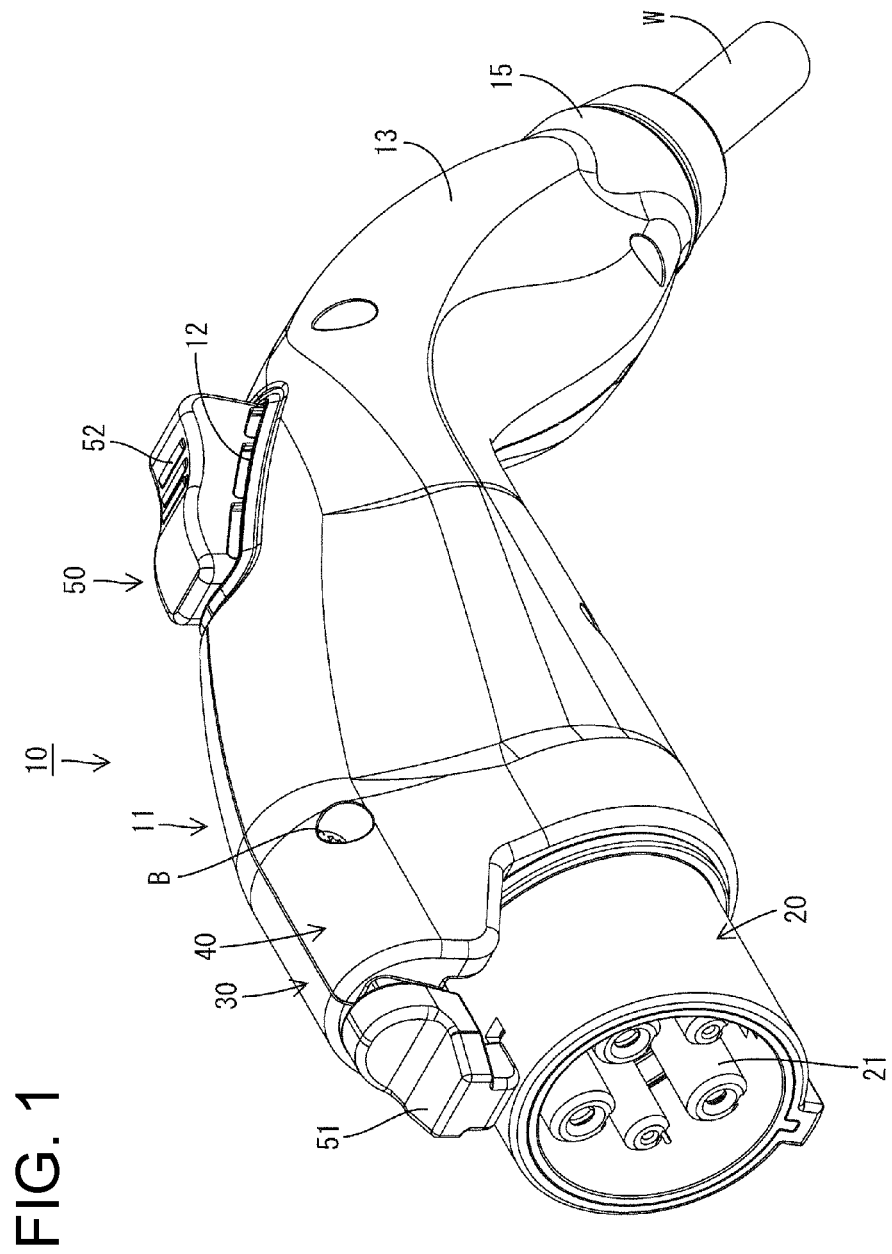
FIG. 1 is a perspective view of a charging connector.
Figure 2:
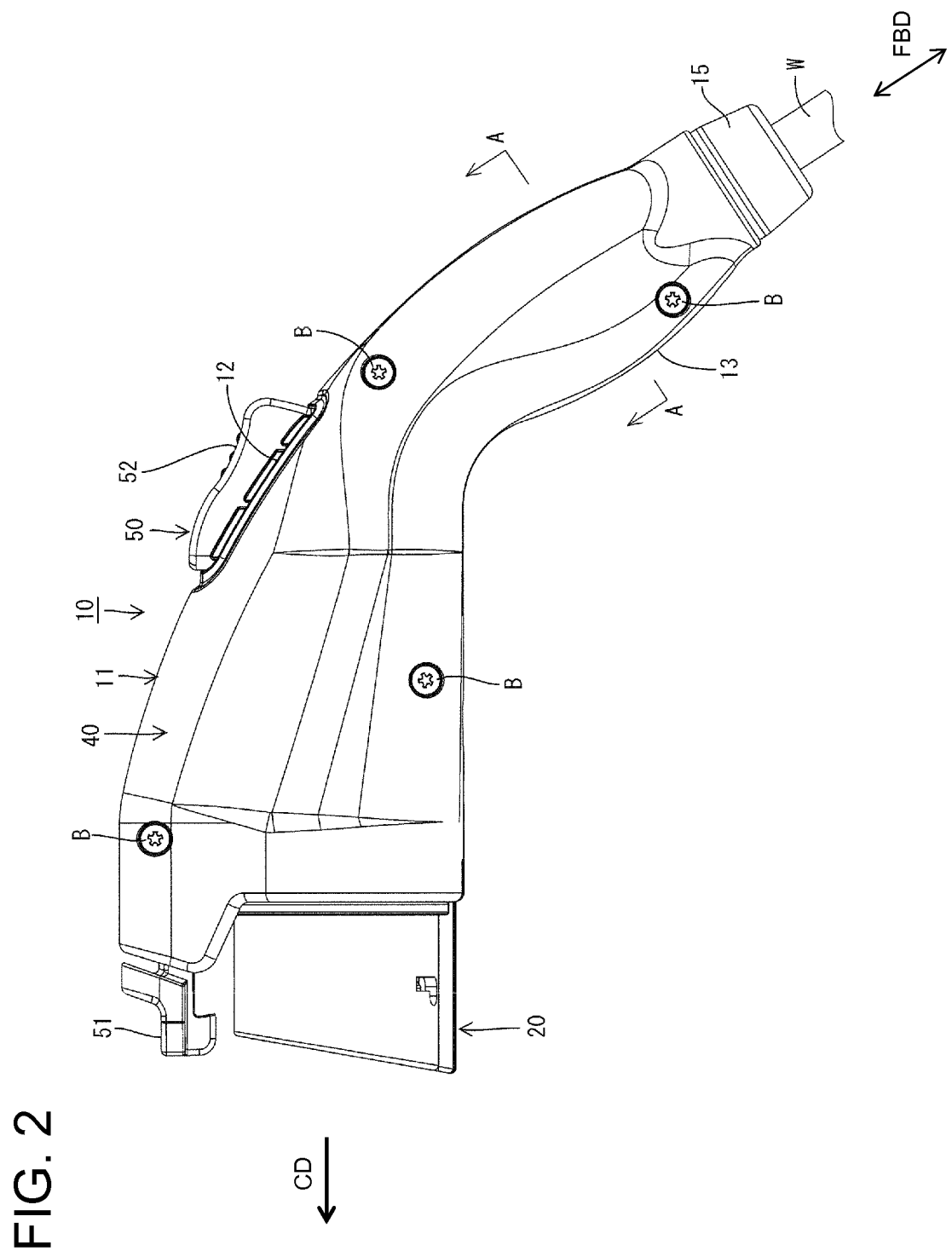
FIG. 2 is a side view of the charging connector.

A charging connector in accordance with the invention is identified generally by the number 10 and includes a housing 11 having a pistol shape. The housing 11 comprises a front housing 20 connectable to a vehicle-side connector (not shown). A base housing 30 and a cover housing 40 hold the front housing 20 from left and right sides. Further, as shown in FIG. 2, the base housing 30 and the cover housing 40 are fixed to one another by bolts B. It should be understood that the base housing 30 and the cover housing 40 may be fixed to one another by clips, retainers, latches, or similar coupling members.

Figure 3:
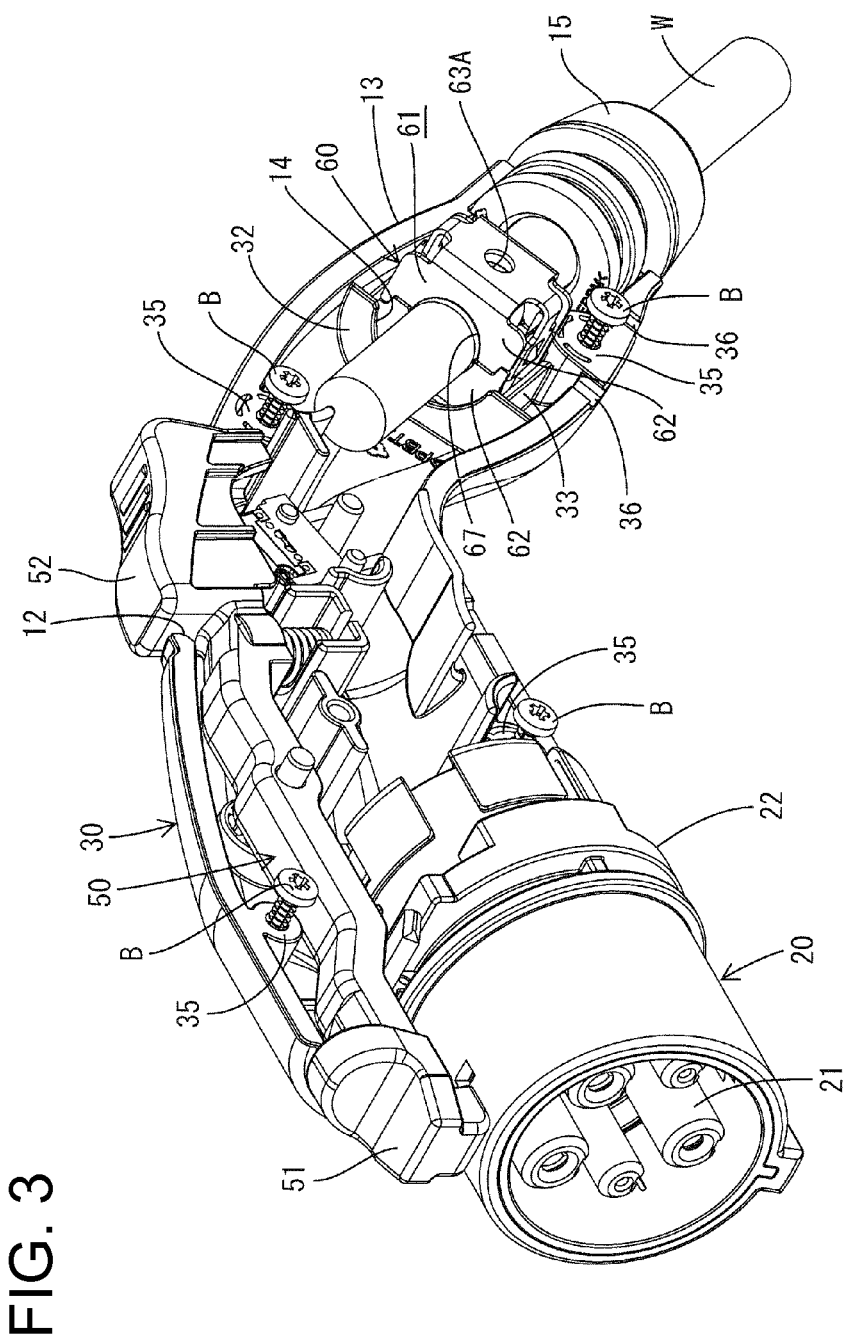
FIG. 3 is a perspective view showing a state where a cover-side housing is removed in FIG. 1.

As shown in FIG. 3, at least one wire W is held in a clip 60 housed in a grip 13 of the housing 11. The clip 60 preferably is made of metal The grip 13 extends rearward from a release button 52 and is aligned obliquely down with respect to a connecting direction CD of the front housing 20 to the vehicle-side connector. Note that a longitudinal direction of the wire W is referred to as forward and backward directions FBD and a draw-out direction of the wire W is referred to as a backward direction in the following description on the internal structures of the grip 13 and the clip 60.

The wire W is drawn out backward from the grip 13 and is to be connected to a household power supply. A battery (not shown) installed in a vehicle is to be charged by connecting the charging connector 10 to the vehicle-side connector.

Figure 6:
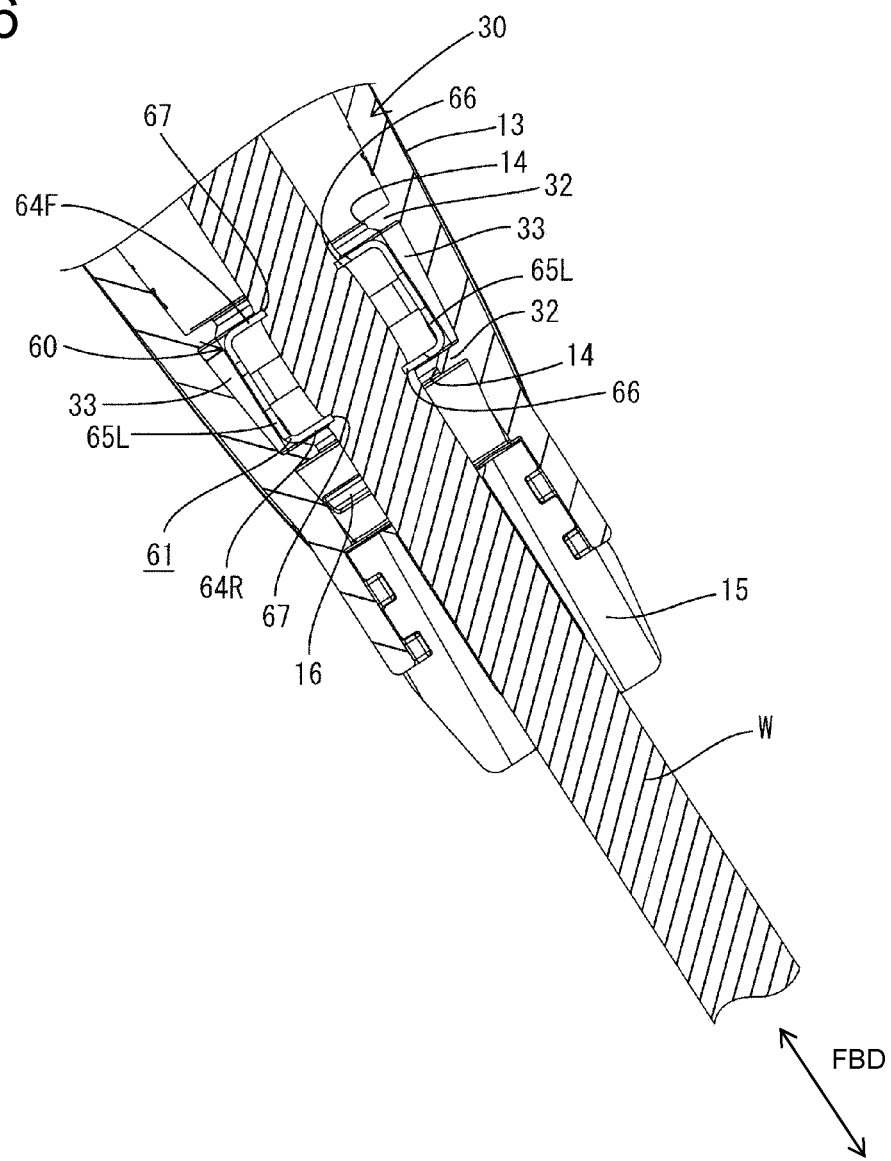
FIG. 6 is a section showing the wire holder in FIG. 3 cut along a longitudinal direction of a wire to be divided into upper and lower parts when viewed sideways.

A contact bush 15 is mounted in a draw-out opening of the grip 13 for the wire W. The contact bush 15 is made of a flexible or resilient material, such as flexible rubber material, and projects back from the rear end of the grip 13, as shown in FIG. 6. The contact bush 15 is to be positioned on the inner peripheral surface of the grip 13 while being retained in forward and backward directions FBD by mating engagement of one or more projections and one or more respective recesses. The wire W penetrates through the contact bush 15 to prevent damage by contact of the wire W with the rear end of the grip part 13 when the wire W is shaken in a vertical or lateral direction and provides sealing between the wire and the housing 11.

As shown in FIG. 3, a lever 50 is housed in the housings 30, 40 and a lock claw 51 is provided near the front end of the lever 50. The lock claw 51 projects forward in connection direction CD from the front end opening of the two housings 30, 40 and is out from the front housing 20. The lock claw 51 engages a lock projection (not shown) on the vehicle-side connector when the charging connector 10 is connected to the vehicle-side connector in the connecting direction CD so that the charging connector 10 and the vehicle-side connector are held in a connected state.

On the other hand, the release button 52 is provided near the rear end of the lever 50. This release button 52 projects out through a release window 12 in an upper end corner of the grip 13. The lock claw 51 is displaced away from the first housing 20 when this release button 52 is pushed in. Thus, the lock claw 51 is released from its locked state and the charging connector 10 can be separated from the vehicle-side connector. This release button 52 is pushed down by the thumb while the grip 13 is gripped by the hand.

The front housing 20 is made e.g. of synthetic resin and is a forwardly open tube. Terminal accommodating portions 21 project forward in the front housing 20 along the connecting direction CD and also are in the form of tubes. Female terminals (not shown) are accommodated in the respective terminal accommodating portions 21. Small-diameter wires are connected to the female terminals by crimping and are bundled together in the housing 11 to form a large-diameter wire W that passes through the grip 13 and out from the rear end of the grip 13.

Figure 4:
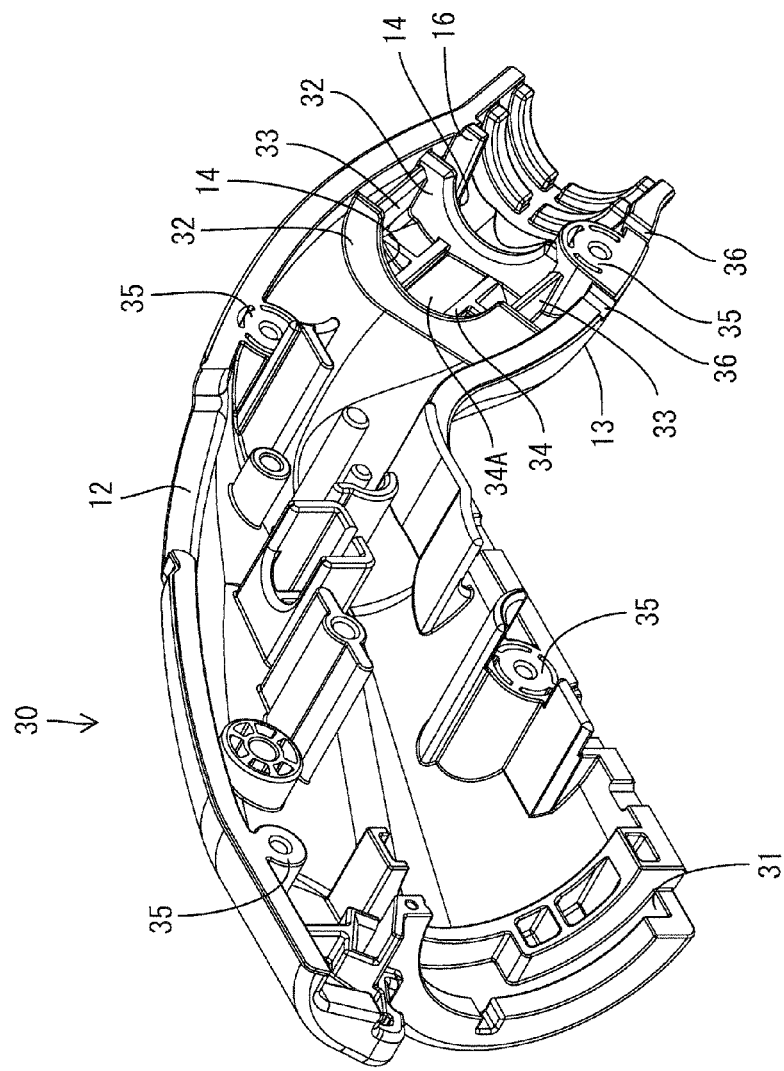
FIG. 4 is a perspective view showing only a base-side housing in FIG. 3.
Figure 5:
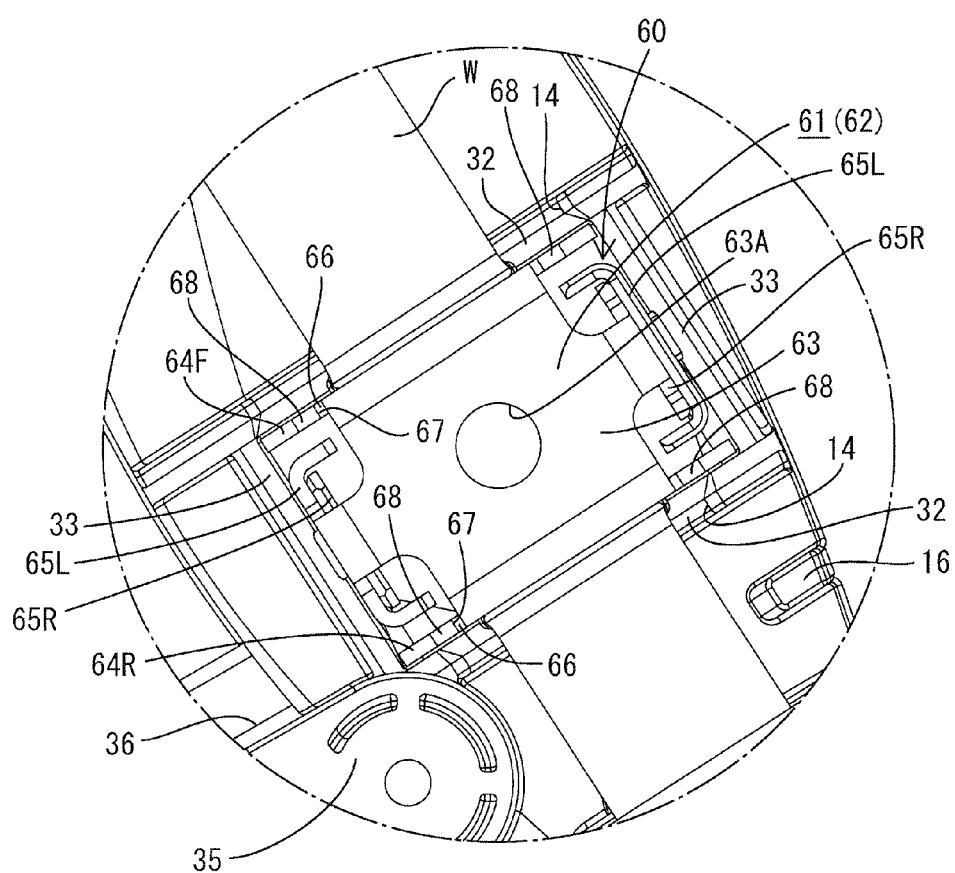
FIG. 5 is a side view of a wire holder in FIG. 3 when viewed sideways.
Figure 8:
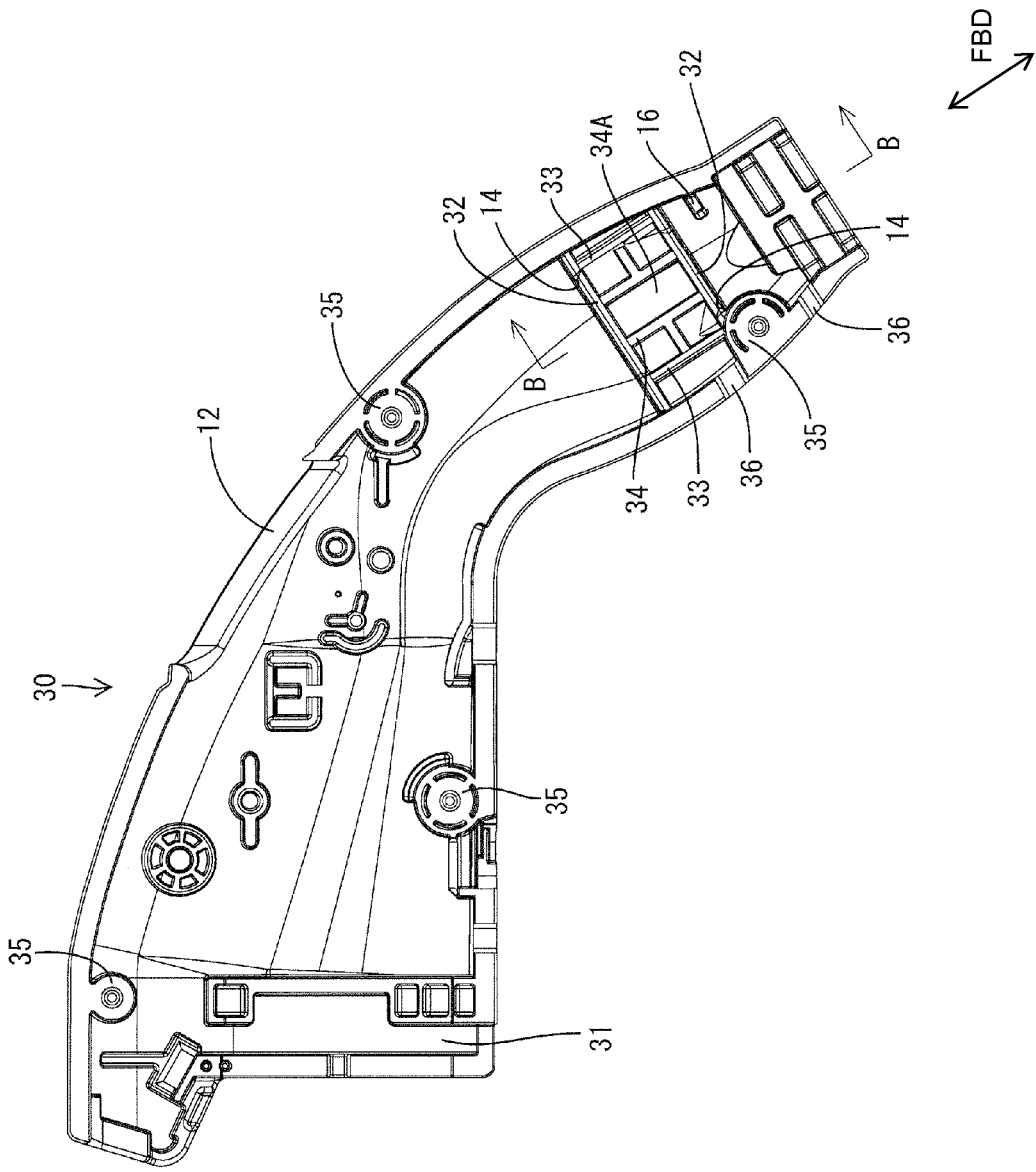
FIG. 8 is a side view showing an inner surface side of the base-side housing.
Figure 9:
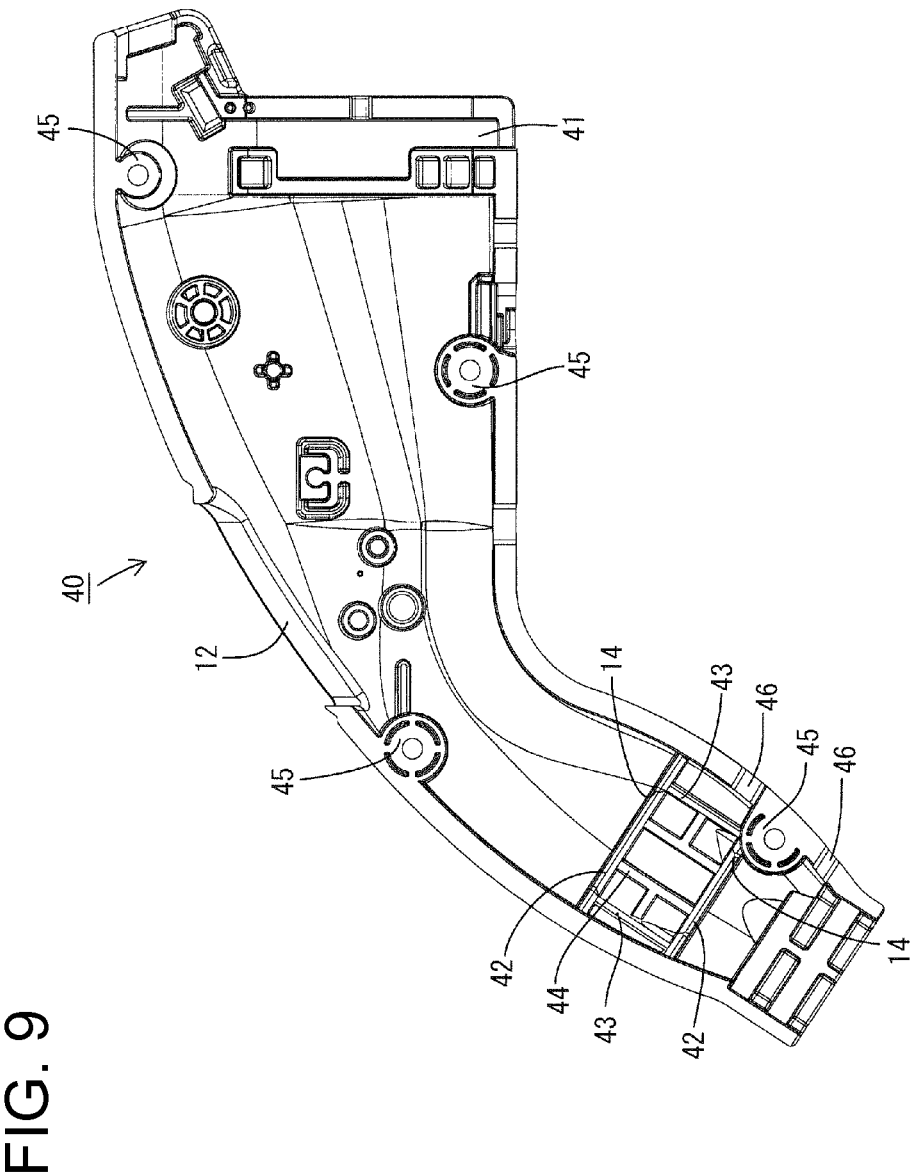
FIG. 9 is a side view showing an inner surface of the cover-side housing.
Figure 10:
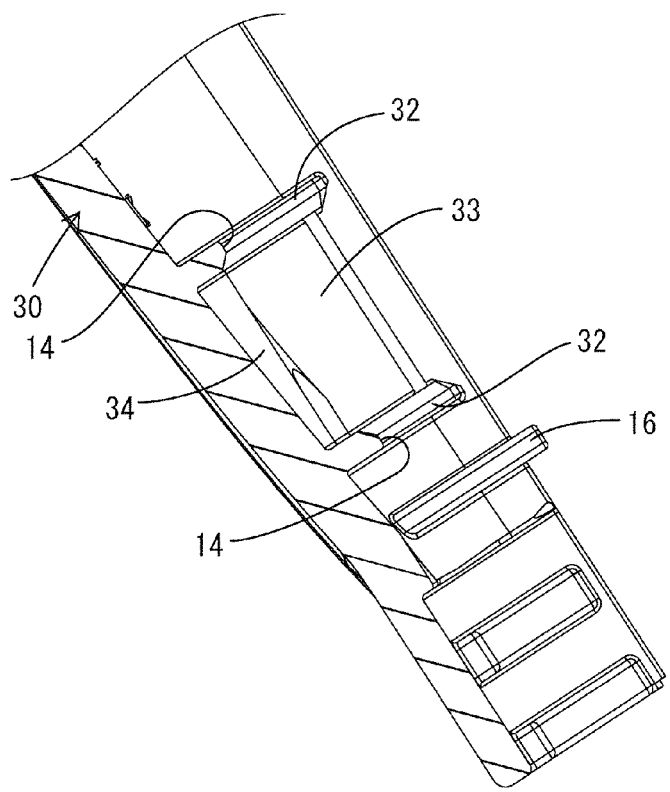
FIG. 10 is a section along B-B of FIG. 8.

As shown in FIG. 3, an outwardly projecting flange 22 extends circumferentially around the rear end of the front housing 20. On the other hand, as shown in FIGS. 4 and 8, a base mounting groove 31 is provided near a front portion of the base housing 30 for receiving a circumferential part of the flange 22. Similarly, as shown in FIG. 9, a cover mounting groove 41 is provided near a front portion of the cover housing 40 for receiving the remaining circumferential part of the flange 22. Thus, the flange 22 is held from left and right sides by the mounting grooves 31, 41. The housings 30, 40 then are fastened by the bolts B to hold the front housing 20 tightly from left and right sides by the base housing 30 and the cover housing 40.

In this way, the front end of the housing 11 is in a backlash-free rigid state and defines a rigid body with no likelihood of displacing the housings 30, 40 when the base housing 30 and the cover housing 40 are assembled and fastened by the bolts B. However, unlike the front housing 20, there is no member firmly held in the grip 13. Thus, there is a concern that the housings 30, 40 may be displaced in a tightening direction of the bolts B when the bolts B are tightened.

Bolt fastening portions 35, 45 are provided in the housing 11. The bolt fastening portions 35, 45 most distant from the front housing 20 are provided near the contact bush 15 in the grip 13. Before the both housings 30, 40 are assembled, the bolt fastening portion 35 is connected to an opening edge of the base housing 30 in the grip 13 and the bolt fastening portion 45 is connected to an opening edge of the cover housing 40 in the grip 13, as shown in FIGS. 8 and 9. A force acting in a clockwise direction about the bolt fastening portion 45 may be produced in the cover housing 40 when the bolts B are fastened to the bolt fastening portions 35, 45. As a result, the opening edge located at a side opposite to the bolt fastening portion 45 may try to rotate toward the bolt fastening portion 35 of the base housing 30.

Accordingly, at least one positioning rib 16 is provided in the base housing 30 to properly position the cover housing 40, and particularly to prevent rotation or displacement of the cover housing 40. The positioning rib 16 is connected to the opening edge facing the opening edge where the bolt fastening portion 35 is provided and hence is as far as possible from the bolt fastening portion 35. Therefore, proper positioning is particularly effective and a force in a rotational direction is minimized. The positioning rib 16 projects from the opening edge of the base-side housing 30 into the interior of the cover housing 40. Thus, the positioning rib 16 is in contact with the inner surface of the cover housing 40 when the housings 30, 40 are assembled in proper postures to prevent rotation of the cover housing 40.

The clip 60 has a substantially box-shaped main body 61. A mounting portion where the main body 61 is to be mounted is provided in the housing 11. As can be understood from a comparison of FIGS. 8 and 9, this mounting portion is substantially bilaterally symmetrically divided by the base housing 30 and the cover housing 40 and the mounting portions of the base housing 30 and the cover housing 40 face each other when the housings 30, 40 are assembled.

As shown in FIG. 8, the mounting portion of the base housing 30 includes two base retaining portions 32, 32 for preventing forward and backward movements of the main body 61, two base restricting portions 33, 33 for preventing up and down movements of the main body 61 and two base tight holding portions 34, 34 for preventing left and right movements of the main body 61. On the other hand, the mounting portion of the cover housing 40 includes two cover retaining portion 42, 42 for preventing forward and backward movements of the main body 61, two cover restricting portions 43, 43 for preventing up and down movements of the main body 61 and two cover tight holding portions 44, 44 for preventing left and right movements of the main body 61. Here, vertical and lateral directions refer to the orientation in FIG. 7.

The base retaining portions 32, 32 and the cover retaining portions 42, 42 are substantially plate-like and are held in substantially surface contact with the front and rear surfaces of the main body 61, as shown in FIG. 6 to prevent the inclination of the main body 61 while preventing forward and backward movements of the main body 61. Further, a passage hole 14 is formed between the base-side retaining portions 32, 32 and the cover-side retaining portions 42, 42 for receiving the wire W.

Figure 7:
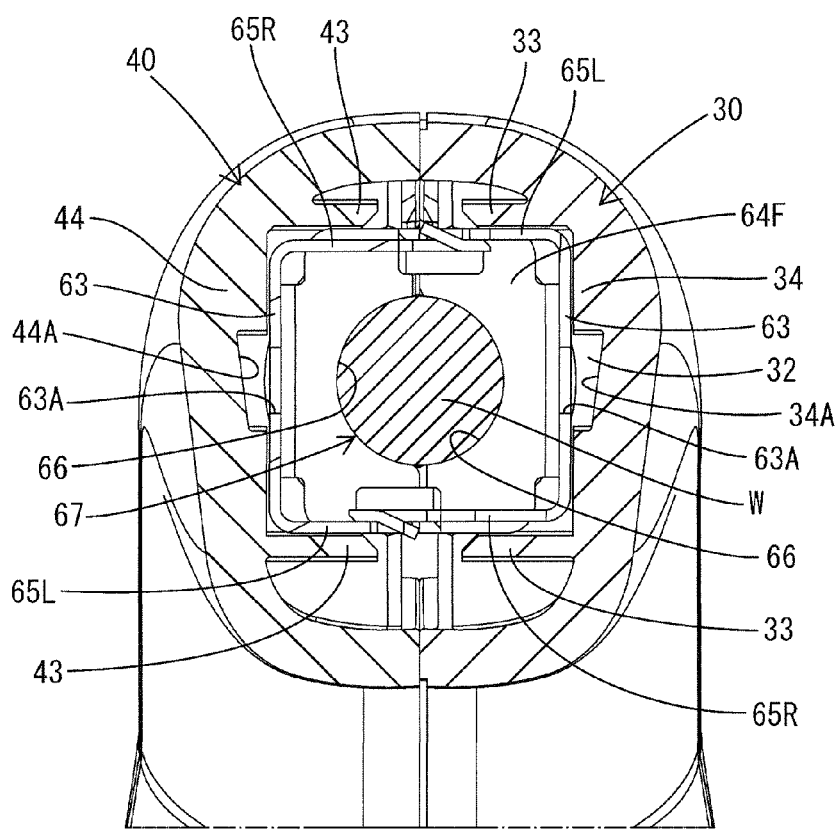
FIG. 7 is a section along A-A of FIG. 2.

As shown in FIGS. 8 and 9, each of the base tight holding portions 34 and the cover tight holding portions 44 has a front-back rib extending in forward and backward directions FBD and a vertical rib extending in the vertical direction (substantially normal to the forward and backward directions FBD). Specifically, two front-back ribs are substantially parallel and two vertical ribs are arranged in series. As shown in FIG. 7, the base tight holding portions 34 and the cover tight holding portions 44 are substantially in line contact with the left and right surfaces of the main body 61 and/prevent inclination and lateral movements of the main body 61.

The base restricting portions 33, 33 and the cover restricting portions 43, 43 all are substantially plate-like and facing parts of the base restricting portions 33 and the cover restricting portions 43 are spaced apart by a specified distance in the lateral direction, as shown in FIG. 7. Further, the base restricting portions 33, 33 are in substantially surface contact with the upper and lower surfaces of the main body 61 to prevent inclination of the main body 61 and to prevent up and down movements of the main body 61. On the other hand, the cover restricting portions 43, 43 are in substantially surface contact with the upper and lower surfaces of the main body 61 to prevent inclination of the main body 61 and to prevent up and down movements of the main body 61. That is, the main body 61 of the clip 60 is held so as not to rotate or incline relative to the housing 11 and is prevented from moving vertically, laterally and longitudinally.

The rear retaining portions 32, 42 are connected to the bolt fastening portions 35, 45. Recesses 36, 46 are formed at the front and rear sides of the bolt fastening portions 35, 45 on the opening edges of the housings 30, 40. Front and rear water drainage holes are formed near the base recesses 36 and the cover recesses 46 when the housings 30, 40 are assembled. Thus, water that may have entered the interior of the grip 13 is discharged to the outside through the water drainage holes.

Figure 11:
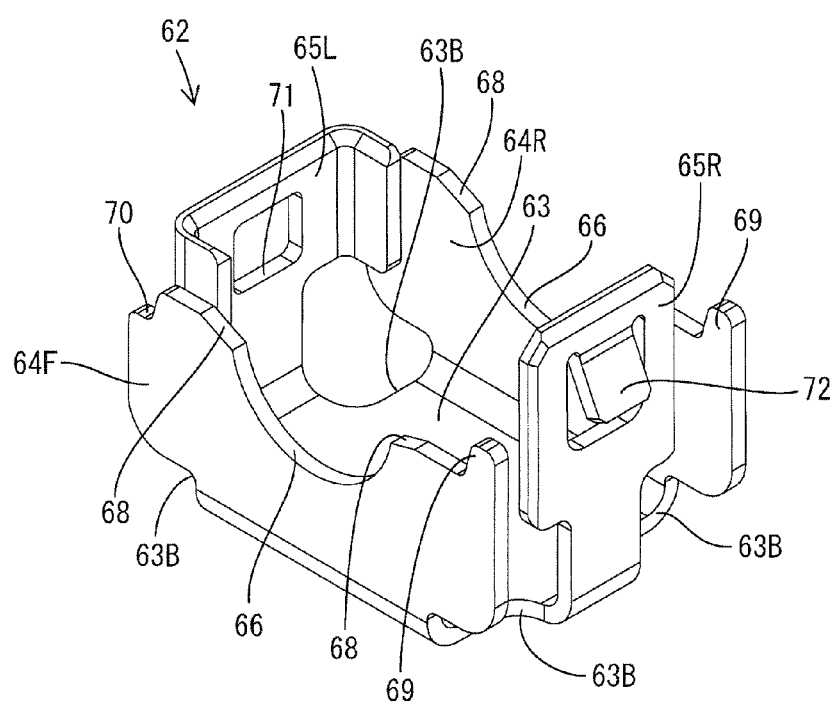
FIG. 11 is a perspective view of a half member.
Figure 12:
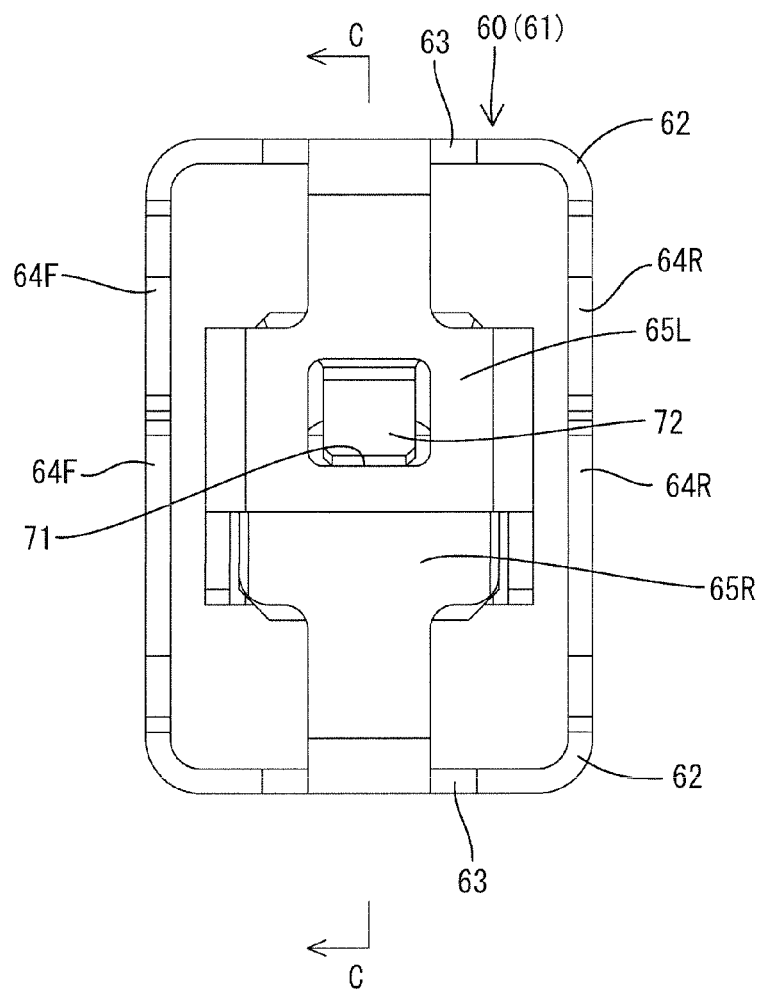
FIG. 12 is a plan view of the wire holder.

The main body 61 of the clip 60 is formed by assembling half members 62 shown in FIG. 11 with each other. The half members 62 are identical components and each includes a bottom wall 63. A front wall 64F and a rear wall 64R stand up from the front and rear edges of the bottom wall 63 while substantially facing each other, and left and right side walls 65L, 65R stand up from the left and right edges of the bottom wall 63 while substantially facing each other. Openings 63B are formed at four corners of the bottom wall 63. Thus, water that may have entered the interior of the main body 61 can be discharged to the outside by the openings 63B.

Figure 13:
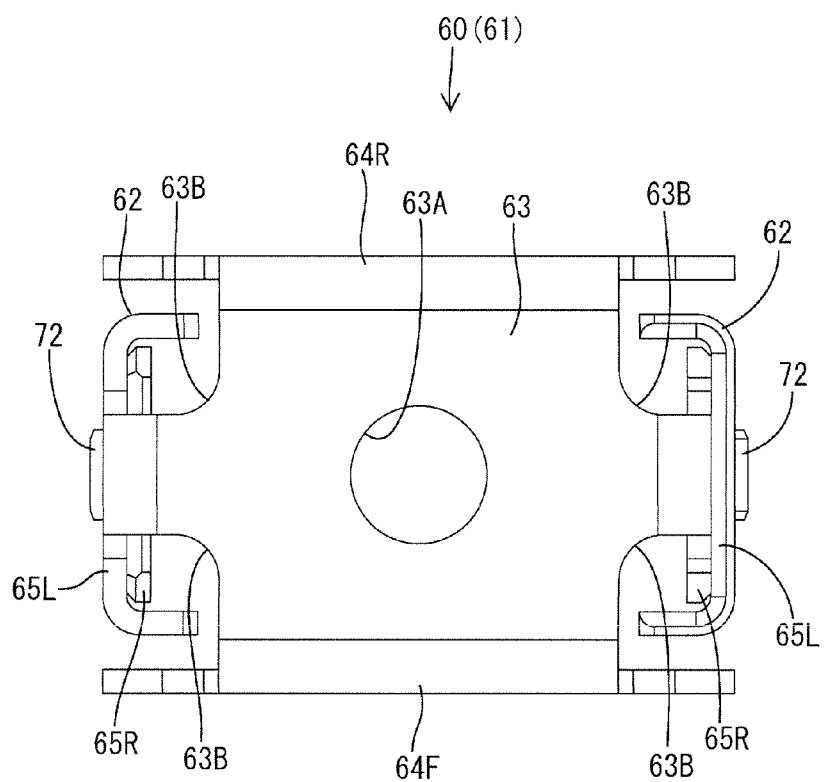
FIG. 13 is a side view of the wire holder.

As shown in FIG. 13, a substantially round hole 63A penetrates the center of the bottom wall 63. The holes 63A, 63A are coaxial when the half members 62, 62 are assembled, as shown in FIG. 13. Further, the base tight holding portions 34 and the cover tight holding portions 44 hold the bottom wall 63 tightly from left and right sides, as shown in FIG. 7. Grooves 34A, 44A are formed at positions of the tight holding portions 34, 44 corresponding to the round holes 63A, 63A. In this way, water that may have entered the interior of the main body 61 of the clip 60 can be discharged to the outside via the holes 63A, the grooves 34A, 44A and the recesses 36, 46.

Figure 14:
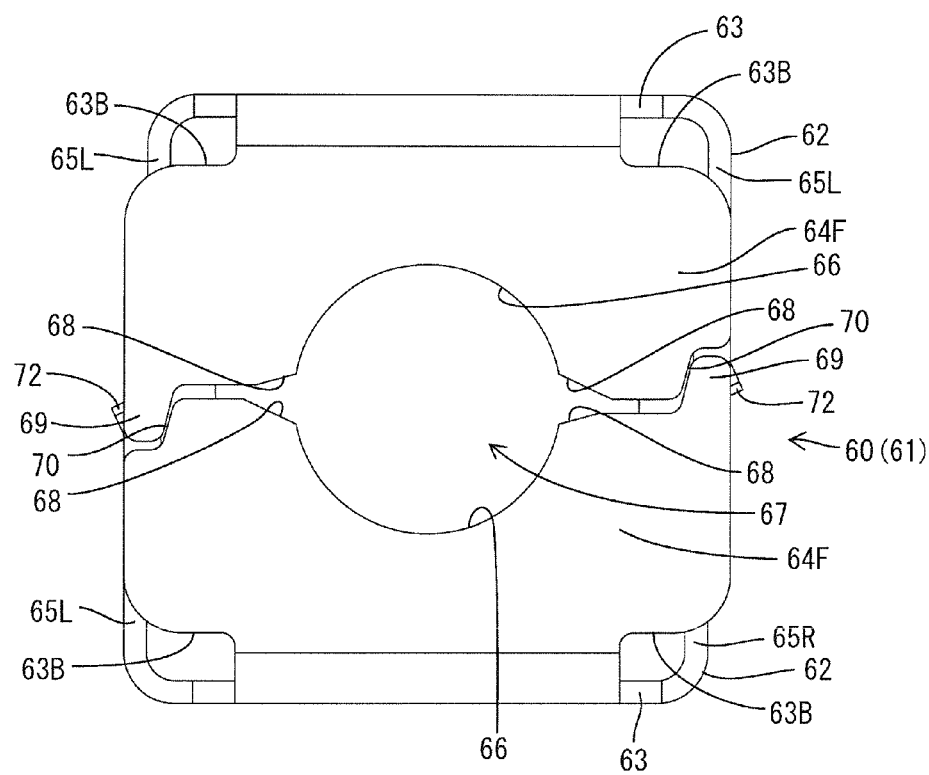
FIG. 14 is a front view of the wire holder.

As shown in FIG. 14, end edges of the front walls 64A face each other and butt each other from left and right sides. The butting edge of each front wall 64A, 64A each includes an arcuate curved portion 66. The curved portions 66, 66 face each other when the two half members 62, 62 are assembled to define a wire insertion hole 67 through which the wire W is inserted. The curved portions 66, 66 engage and resiliently press the wire W, as shown in FIG. 6, without damaging the insulation coating of the wire W. Thus, the metal clip 60 firmly retains the wire W without damage to the wire W.

Escaping portions 68 are provided at the opposite ends of each curved portion 66 and incline radially out of the wire insertion hole 67, as shown in FIG. 14. Escaping spaces are formed in areas sandwiched between the escaping portions 68 and communicate with the wire insertion hole 67 when the half members 62 are assembled. The wire W can escape into the escaping spaces when held excessively tightly by the curved portions 66. Further, the front and rear walls 64F, 64R are deformed away from each other with the bottom wall 63 as a center when the curved portions 66 are pressed firmly against the wire W so that a pressing force acting on the wire W can be relaxed, thereby further assuring that the curved portions 66 will not damage the wire W.

As shown in FIG. 14, the wire insertion holes 67 are coaxial and spaced apart in the longitudinal direction of the wire W. Thus, pressing forces on the wire W are less than if the wire W was held only by one wire insertion hole 67.

A positioning projection 69 is provided on one end of each of the butting edges of the front walls 64F, 64F, and a step 70 for receiving the mating positioning projection 69 is on the other end. The positioning projections 69 fit in the steps 70 and lock in the vertical direction to prevent displacements of the assembled half members 62, 62.

Figure 15:
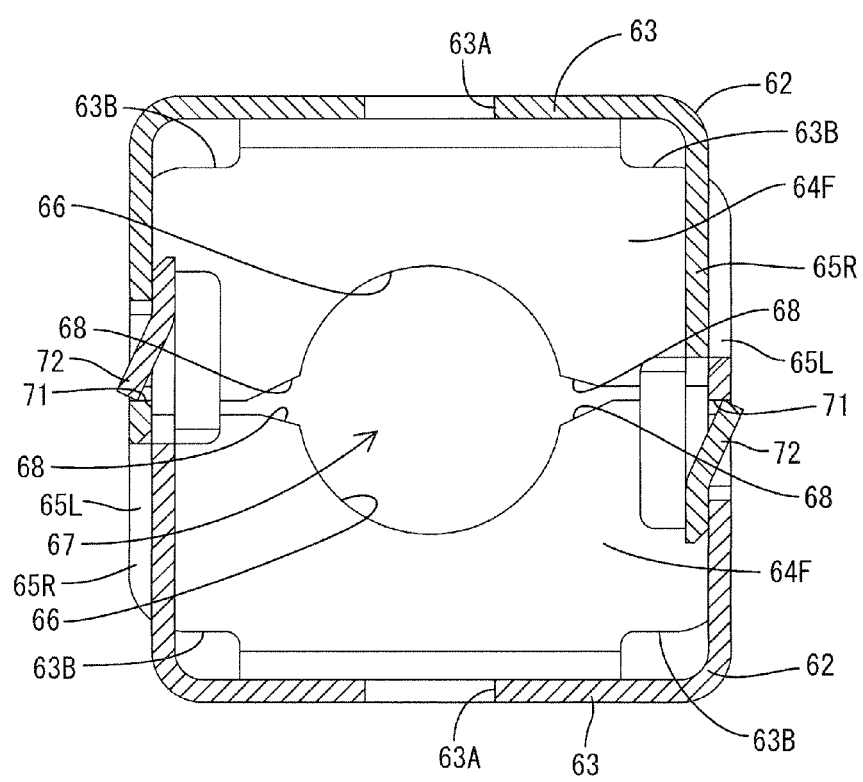
FIG. 15 is a section along C-C of FIG. 12.

A locking hole 71 penetrates through one of the left and right side walls 65L, 65R, and a resiliently deformable locking piece 72 is provided at the other by cutting and bending. The locking piece 72 of the one half member 62 fits in the locking hole 71 of the other half member 62 when the half members 62, 62 are assembled so that the tip of the locking piece 72 engages the inner surface of the locking hole 71, as shown in FIG. 15, to retain the half members 62, 62. Note that, with the locking pieces 72 fit in the locking holes 71, the positioning projections 69 and the steps 70 come into contact if there is an attempt to separate the locking pieces 72 from the locking holes 71 in a direction perpendicular to an assembling direction of the half members 62, 62. Thus the locking pieces 72 are held in the locking holes 71 and the both half members 62, 62 are held assembled.

The front housing 20 and the lever 50 are assembled with the base-side housing 30. Additionally, the wire W is supported by both curved portions 66 of one half member 62 of the clip 60. The two half members 62 then are assembled to one another to hold the wire W tightly by the curved portions 66, 66 of the half members 62, 62. In this way, the clip 60 is fixed to the wire W.

Subsequently, the clip 60 is mounted in a proper posture between the two base retaining portions 32, 32 in the grip 13 and between the both base restricting portions 33, 33 in the grip 13. In this state, the front and rear walls 64F, 64R of the half member 62 are in substantially surface contact with the base retaining portions 32, 32, the left and right side walls 65L, 65R of the half member 62 are in substantially surface contact with the both base restricting portions 33, 33 and the bottom wall 63 of the half member 62 is in substantially line contact with the base tight holding portions 34. The half members 62 then are assembled so that the curved portions 66, 66 press the wire W. The locking pieces 72, 72, which had been resiliently deformed by the lateral side walls 65L, 65R, return resiliently upon reaching proper mount positions and fit into the locking holes 71, 71. In this way, the two half members 62, 62 are assembled to form the main body 61, and this main body 61 is fixed to the wire W.

The cover housing 40 then is assembled with the base housing 30. Thus, the flange 22 of the front housing 20 is fit into the mounting grooves 31, 41 of the housings 30, 40 and the front housing 20 is held tightly by both housings 30, 40. Subsequently, the bolts B are tightened into the bolt fastening portions 35, 45. The cover housing 40 may try to rotate in a clockwise direction as the bolts B are tightened into the bolt fastening portions 35, 45 in the grip 13 due to a torque produced at the time of tightening. However, the inner surface of the cover housing 40 contacts the positioning ribs 16 of the base housing 30 to prevent rotation of the cover housing 40. The charging connector 10 is completed by tightening the bolts B.

As described above, the cover housing 40 may try to rotate in the clockwise direction about the bolt fastening portion 35 when the bolt B is tightened. However, the positioning rib 16 is provided on the opening edge at the side opposite to the bolt fastening portion 35 in the grip 13. The positioning rib 16 contacts the inner surface of the cover housing 40 to prevent rotation of the cover housing 40. Thus, it is sufficient to provide the positioning ribs 16 only in the base housing 30 and it is not necessary to provide the cover housing 40 with a displacement preventing mechanism. Thus, the housings 30, 40 can be positioned without being subject to spatial restriction. Further, the positioning ribs 16 are provided at the position distant from the bolt fastening portion 35 so that a force acting on the positioning rib 16 in a rotational direction can be minimized.

Further, the main body 61 of the clip 60 is held from front and rear ends by the retaining portions 32, 42, is held from upper and lower sides by the restricting portions 33, 43 and is held from lateral sides by the tight holding portions 34, 44. Accordingly, the main body 61 of the clip 60 cannot rotate about the axis of the wire W, cannot displace in the grip 13 and cannot move in the longitudinal direction of the wire W. Further, the curved portions 66 uniformly press the wire W to prevent damage to the wire W. Furthermore, the escaping portions 68 are provided to allow the wire W to escape and front and rear wire insertion holes 67 are provided. Thus, a pressing force on the wire W can be reduced and the damage of the wire W can be further prevented.

The invention is not limited to the above described embodiment. For example, the following embodiments also are included in the scope of the invention.

Although the positioning rib 16 is connected to the rear opening edge of the grip part 13 shown in FIG. 8 in the above embodiment, it may be connected to the front opening edge in FIG. 8 according to the present invention. In this case, the bolt fastening portion may be connected to the rear opening edge shown in FIG. 8.

Although the positioning rib 16 is illustrated as a positioning portion in the above embodiment, the positioning portion may not be in the form of a rib according to the present invention. For example, a claw-shaped lock portion may be provided as the positioning portion, a hole may be formed in the inner surface of the cover-side housing, the housings may be temporarily held together by engaging the leading end of the lock portion with the hole and the base end side of the lock portion may be brought into contact with the inner surface of the cover-side housing (peripheral edge of the hole).

Although the positioning rib 16 and the bolt fastening portion 35 are respectively connected to different opening edges in the above embodiment, they may be respectively connected to the same opening edge according to the present invention.

Although the positioning rib 16 is provided in the grip part 13 in the above embodiment, it may be provided in a part other than the grip part 13.

What is claimed is:

1. A charging connector, comprising:
a housing having opposite front and rear ends and formed by fixing a cover and a base together, the cover and the base each having opposite inner and outer surfaces and opposite first and second edges extending between the inner and outer surfaces, the first and second edges of the cover and the base being disposed so that the first edges of the cover and base abut and so that the second edges of the cover and base abut;
a connector connecting portion mounted at the front end of the housing and tightly held by the cover and the base;
bolt fastening holes registered with one another at positions in proximity to the first edges of the cover and the base and at locations distant from the connector connecting portion; and
at least one positioning projection provided at a position of the base substantially adjacent to and inward of the second edge and at a position substantially opposite the bolt fastening holes and distant from the connector connecting portion, the positioning projection contacting the inner surface of the cover substantially adjacent to and inward of the second edge of the cover when the cover and the base are assembled in proper postures for preventing the cover and the base from rotating upon receiving a force in a rotational direction produced as bolting is performed at the bolt fastening holes.

2. The charging connector of claim 1, wherein the housing includes a grip arranged behind the connector connecting portion and from which at least one wire is drawn out and the positioning projection is provided at the grip.

3. The charging connector of claim 1, wherein at least one wire is drawn out from the housing and a holder mounted into in the housing and holding the wire fixed with respect to the housing.

4. The charging connector of claim 3, wherein the housing is divided substantially symmetrically by the cover and base.

5. The charging connector of claim 3, wherein the positioning projection is adjacent to the holder.

6. The charging connector of claim 3, wherein the positioning projection has opposite front and rear surfaces aligned substantially perpendicular to the wire.

7. The charging connector of claim 1, wherein the first and second edges of the base are substantially co-planar between the inner and outer surfaces of the base, and the first and second edges of the cover are substantially co-planar between the inner and outer surfaces of the cover.

8. The charging connector of claim 7, wherein the positioning projection projects substantially perpendicular to a plane defined by the co-planar first and second edges of the base.

9. The charging connector of claim 1, wherein the positioning projection projects inward from the inner surface of the base toward the first edge of the base.

10. The charging connector of claim 1, wherein the positioning projection has a thickness measured in a front to rear direction of the housing that does not exceed a thickness of the base measured between the inner and outer surfaces thereof.

11. The charging connector of claim 1, wherein the positioning projection has opposite front and rear surfaces aligned substantially perpendicular to the second edge.

12. The charging connector of claim 1, wherein the positioning projection has opposite front and rear surfaces aligned substantially parallel to one another.

* * * * *